3,222,189
CONVENIENCE FOOD PACKAGE AND PROCESS
Joseph R. Perrozzi, Minneapolis, Minn., assignor to The
Pillsbury Company, Minneapolis, Minn., a corporation
of Delaware
No Drawing. Filed July 5, 1963, Ser. No. 293,178
13 Claims. (Cl. 99—172)

This application is a continuation-in-part of co-pending application Serial No. 154,040, filed November 21, 1961, and assigned to the same assignee. Co-pending application Serial No. 154,040 was a continuation-in-part of then co-pending application Serial No. 38,729, filed June 27, 1960, and assigned to the same assignee, both applications are now abandoned.

This invention relates to a convenience food article and is particularly concerned with the provision of non-frozen, non-refrigerated complete dough or batter products of excellent quality and of advanced convenience and utility.

The only complete dough or batter products presently known to the convenience food art are prepared in accordance with conventional formulations and then either frozen or refrigerated to permit their distribution and stocking. Although these products are generally satisfactory, they are nevertheless in possession of certain very serious disadvantages. For example, when dough or batter products are frozen, it is possible to obtain quite an extended shelf-life but the ultimate products prepared from such products suffer in quality. On the other hand, those products that are refrigerated are generally of better quality than their frozen counterparts but they possess some very serious shelf-life limitations.

Besides frozen and refrigerated complete dough or batter products, there are also available pre-mixes. These products however are incomplete and therefore stand substantially rearward of the frozen and refrigerated products in respect of convenience. They are however, by virtue of being incomplete, quite shelf-stable and may be stored under ambient conditions for relatively long periods of time.

Heretofore the art has not been provided with complete dough or batter products of extended shelf-stability under ambient conditions.

It is an object of this invention to provide such products to the convenience food art.

It is another object of this invention to provide such products in forms which will not require any further processing by the consumer in advance of cooking.

Still another object of the instant invention is to provide dough or batter articles of the type described in forms which may be easily merchandized in disposable baking receptacles.

Another object of the invention is to provide dough or batter products of the type described which will yield quality products upon cooking.

Other objects of the invention will appear from the following description and examples.

In general this invention comprises the combination of a closed container impervious to alcohol vapor and a dough or batter admixture comprising vital gluten and/or wheat starch, water and ethyl alcohol.

More particularly, I have discovered that by substituting a blend of water-washed wheat gluten and/or wheat starch or a water-washed reconstituted wheat flour for the normal flour or starch ingredient of such products as pie crust and pizza dough, cookie doughs, gravys, puff pastries, cake and pancake batters and including a quantity of ethyl alcohol with the water constituent of the product, that I can provide a dough or batter of excellent shelf-stability and quality providing the dough or batter thus prepared is packaged in a container which is impervious to alcohol vapor.

While it is of course well known that ethyl alcohol may be used as a preservative for some purposes, it has been found that ethyl alcohol, per se, cannot be used to preserve dough or batter products for any length of time under ambient conditions.

With the instant invention, however, it has been discovered that when such dough or batter products are prepared employing water-washed gluten and/or starch constituents, and including a quantity of ethyl alcohol with the water of formulation, that the resultant product is of excellent quality even after being stored for more than 24 weeks under ambient conditions.

In selecting gluten and/or starch (which may or may not be reblended to provide a reconstituted or a synthetic flour) it has been found desirable, though not essential, to select ingredients of relatively low bacterial content. However, if such ingredient selection is inconvenient or impractical, the starch and/or gluten or reconstituted or synthetic flour may simply be brought to a temperature of about 180° F. for approximately three minutes.

The quantity of ethyl alcohol required by the invention may vary rather widely. It is preferable to use a quantity of about 5% basis total product. If less than about 5% is used, the product's shelf-life tends to be somewhat shorter, whereas an amount substantially in excess of 5% tends to produce a gradual diminution of product quality and it is preferred that the alcohol not exceed about 60% of the total liquid in the dough formula.

In preparing dough or batter in accordance with the instant invention, it has also been found desirable, though not essential, to select a shortening (when shortening is employed) having a somewhat higher than average melting point. By doing this, it is possible to avoid the formation of fat "lakes" which may result from storage under high temperatures. It has also been found that the flavor of the final product may be enhanced by the inclusion of a small amount of salt in the dough or batter formula, though of course this treatment is entirely optional and discretionary with the operator.

To obtain the best ultimate results, it is also desirable that preparation of the dough or batter be conducted under asceptic conditions and, that once prepared the dough or batter be packaged immediately. Moreover, it is also desirable that the packaging operation be conducted under asceptic conditions.

Although the dough or batter may be put into any desirable physical form for packaging, a ready-to-bake form in a disposable baking receptacle is most preferred since this makes it ready for immediate use and thereby provides the ultimate in convenience to the consumer.

Further illustration of the present invention may be had by reference to the following examples:

*Example I*

A dry admixture was prepared comprising about 65% of a water washed reconstituted flour, 32% shortening, and 3% salt. Using conventional technology this dry admixture was hydrated with 90 cc. of a liquid comprising 63 cc. of distilled water and 27 cc. of U.S.P. grade ethyl alcohol. This hydrated admixture was then rolled out and formed into a circular sheet of dough of about 9 inches in diameter. The rolled-out dough sheet was then placed between two sheets of waxed paper and folded twice over to form a quarter-circle. Then the folded dough sheet was deposited in a polyethylene bag, and using conventional methods, the bag was filled with nitrogen and heat-sealed in the usual manner.

A number of dough packages were prepared in this manner and stored under ambient conditions over a 24 week test period during which time samples were regularly removed from storage every three weeks and evaluated with respect to quality and performance. All of the products proved to be satisfactory throughout the entire 24 weeks of test storage.

Example II

Pie doughs were also prepared in accordance with the method outlined in Example I but utilizing a blend of about 57% water-washed wheat starch and 8% water-washed wheat gluten (basis total ingredients) for the flour component of the pie dough formula. In this batch of samples, the packaging conditions were also varied by simply evacuating and sealing the containers to thereby provide a vacuum pack for the doughs thus produced. These doughs were likewise subjected to conventional storage testing under ambient conditions for a 24 week test period and were likewise found to be of satisfactory quality throughout the entire 24 week test.

Example III

In another series of test pie doughs, rolled-out pie doughs were prepared in accordance with the method of Example I but utilizing a shortening component having a melting point of about 115° F. which is slightly higher than the melting point of conventional shortening. In this series the packaging conditions were also further varied by depositing the dough in rolled-out condition, rather than in folded condition, and by surrounding the dough with an air atmosphere within the sealed container. When this series of doughs was subjected to the storage testing treatment of Example I, all products were again found satisfactory throughout the entire storage period.

Example IV

Another series of pie doughs was prepared in accordance with the method of Example I wherein the dough formula was varied by entirely eliminating the salt. In this series the doughs were packaged in $CO_2$ and deposited as rolled-out dough sheets in disposable baking receptacles which were placed into the package along with the doughs. The group of doughs was also subjected to storage testing for a 24 week period and they too were found satisfactory throughout the entire test period.

Example V

Butterscotch cookie dough has also been prepared by first blending together the following dry ingredients in the indicated proportions:

| | Percent |
|---|---|
| Water-washed wheat starch | 26.69 |
| Water-washed wheat gluten | 1.70 |
| Corn flour | 3.12 |
| Sugar | 29.02 |
| Dehydrated egg yoke | 1.19 |
| Salt | 1.19 |
| Non-fat dry milk solids | .40 |
| Chopped nuts | 9.44 |

An alcohol-water mixture was then prepared in accordance with the following formulation:

| | Percent |
|---|---|
| Ethyl alcohol | 1.32 |
| Water | 5.28 |
| Sodium bicarbonate | .915 |
| Metacalcium phosphate | .617 |
| Vanilla | .018 |

The blend of dry ingredients was then chilled to between about 30° to 40° F. by addition thereto of Dry Ice, after which melted shortening (having a temperature of about 120° F.) was stirred into the chilled dry ingredients. After the shortening and dry ingredients were thoroughly intermixed, the alcohol-water mixture containing sodium bicarbonate, metacalcium phosphate and vanilla was blended into the dry ingredients and shortening to form the same into a dough, and pieces of the resultant dough were then packaged in alcohol-vapor impervious containers as in the previous examples.

The results had with these doughs were also satisfactory.

Example VI

Puff pastry dough has also been prepared by blending together 30.6% water-washed starch, 5.4% water-washed gluten, and 0.5% salt into which was cut 4.6% margarine. A blend of alcohol and water comprising approximately 20% alcohol was then made up and mixed into the blend of starch, gluten, salt and margarine to form the same into a dough which was rolled and sheeted to a thickness of about ⅛ to ¼ of an inch to provide a rectangular shaped dough piece, ⅔ of which was then covered with 32.2% of a conventional pastry shortening, which shortening had been rolled to a thickness of about ⅛ to ¼ of an inch. Then the dough and shortening were folded together together and re-rolled in accordance with conventional puff pastry practice. When the rolling and folding was completed the dough was divided into parts and each part was separately packaged in an alcohol-vapor impervious container as in the previous examples and, as in the previous example, the result was satisfactory.

Example VII

Pizza dough was also prepared from the following formulation:

| | Percent |
|---|---|
| Water washed wheat starch | 31.0 |
| Water-washed wheat gluten | 25.0 |
| Water-washed corn starch | 29.3 |
| Whey | 5.0 |
| Dextrose | 2.2 |
| Salt | 1.4 |
| Aluminum metacalcium phosphate | 0.6 |
| Sodium bicarbonate | 0.5 |
| Shortening | 5.0 |

The dry ingredients were blended together and the shortening material was cut in, followed by mild kneading, after which a water-alcohol mixture comprising about 15% ethyl alcohol was blended into the dry ingredients and shortening to convert the mixture into a dough employing approximately 54.3% water-alcohol, basis the total dry ingredients and shortening. The dough was then divided into pieces, each of which was separately packaged in an alcohol-vapor impervious container. The results were again satisfactory.

Example VIII

A batter was prepared according to the following formulation:

| | Percent |
|---|---|
| Shortening | 7.0 |
| Corn meal | 20.0 |
| $H_2O$ | 34.1 |
| $NaHCO_3$ | 1.4 |
| Monocalcium phosphate | 1.5 |
| Flour | 20.0 |
| Ethyl alcohol | .9 |
| NaCl | 1.1 |
| Yolk (powdered) | 1.4 |
| Albumen (powdered) | .6 |
| Milk (powdered) | 5.0 |
| Sugar | 7.0 |

Example IX

A batter was prepared according to the following formulation:

| | Percent |
|---|---|
| Shortening | 7.0 |
| Corn meal | 20.0 |
| $H_2O$ | 31.5 |
| Monocalcium phosphate | 1.5 |
| Flour | 20.0 |
| Ethyl alcohol | 3.5 |
| NaCl | 1.1 |

|                    | Percent |
|--------------------|---------|
| Yolk (powdered)    | 1.4     |
| Albumen (powdered) | .6      |
| Milk (powdered)    | 5.0     |
| Sugar              | 7.0     |
| NaHCO₃             | 1.4     |

In both Example VIII and IX the corn meal was soaked with part of the H₂O. Monocalcium phosphate, NaHCO₃ and ethyl alcohol were then added to the balance of the H₂O. The remaining ingredients with the exception of the shortening were dry blended together. The soaked corn meal was added to the dry blend. The shortening was added. The monocalcium phosphate, NaHCO₃, ethyl alcohol mixture was then added to complete the batter. The batter was satisfactorily preserved after storage.

From the foregoing it can be seen that the present invention provides the food art with a new and advanced series of complete dough and batter products and while certain embodiments of the invention have been given in the several specific examples recited herein, the products of the invention are not limited thereto. It has been found, for example, that the use of decontaminated water in the dough formulation is desirable, though not essential, and the results are entirely satisfactory whenever potable tap water is utilized. Likewise the utilization of a salt level somewhat higher than normally found in dough formulations may be used as a flavor varient although entirely satisfactory results may be had where no salt is utilized. Moreover, although it is desirable to utilize a shortening component of a slightly higher than normal melting point in order to avoid the formation 20 of fat "lakes" at elevated storage temperatures, any shortening otherwise suitable for use in dough formulations may be used with entirely satisfactory results.

What is claimed is:

1. A convenience food article consisting in;
a dough admixture comprising water-washed starch, water-washed gluten, water and a sufficient quantity of ethyl alcohol to improve shelf-stability and quality of said food article, said ethyl alcohol not in excess of about 60% of the total liquid in said dough;
and a container empervious to alcohol-vapor and having said dough admixture sealed therewithin.

2. A convenience food article consisting in;
a pastry dough admixture comprising water-washed reconstituted flour, shortening, water, and a sufficient quantity of ethyl alcohol to improve shelf-stability and quality of said food article, said ethyl alcohol not in excess of about 60% of the total liquid in said dough;
and a container impervious to alcohol-vapor and having said dough admixture sealed therewithin.

3. A convenience food article comprising;
a pastry dough admixture of a synthetic flour comprising a blend of water-washed wheat starch and water-washed wheat gluten, a shortening, water and a sufficient quantity of ethyl alcohol to improve shelf-stability and quality of said food article, said ethyl alcohol not in excess of about 60% of the total liquid in said dough;
and a container having said dough admixture sealed therewithin and impervious to alcohol-vapor.

4. A convenience food article comprising;
a pie dough admixture of a synthetic flour comprising a blend of water-washed wheat starch and water-washed wheat gluten, a shortening, a water and ethyl alcohol blend having a sufficient quantity of ethyl alcohol therein to improve shelf-stability and quality of said food article, said alcohol being present in said blend in a quantity not in excess of about 60% thereof;
and a container having said dough admixture sealed therewithin and impervious to alcohol-vapor.

5. A convenience food article consisting in;
a pie dough admixture comprising water-washed reconstituted flour, a shortening, a blend of water and a sufficient quantity of ethyl alcohol to improve shelf-stability and quality of said food article, said ethyl alcohol comprising at least about 40% water and not in excess of about 60% alcohol, and salt;
and a container formed of material which is impervious to alcohol-vapor and having said dough admixture sealed therewithin.

6. A convenience food article comprising;
a closed container impervious to alcohol-vapor;
and a rolled-out pie dough contained within said closed container and comprising water-washed reconstituted wheat flour, water, shortening, salt and a sufficient quantity of ethyl alcohol to improve shelf-stability and quality of said food article, said ethyl alcohol at a level of about 5%, basis the total quantity of said dough.

7. A convenience food article comprising;
a closed container impervious to alcohol-vapor, a rolled-out pie dough comprising water-washed reconstituted wheat flour, shortening, salt, and a blend of water and a sufficient quantity of ethyl alcohol to improve shelf-stability and quality of said food article, said ethyl alcohol comprising at least about 40% water and not in excess of about 60% alcohol;
and a disposable baking receptacle carrying said rolled-out pie dough within said closed container.

8. The method of making a convenience pie dough article comprising;
the steps of water washing wheat flour to separate the starch and gluten constituents, reconstituting said separated starch and gluten in dry condition to provide water-washed reconstituted flour, admixing said reconstituted flour with a shortening and a blend of water and a sufficient quantity of ethyl alcohol to improve shelf-stability and quality of said food article, said ethyl alcohol to form a pie dough, said blend comprising at least about 40% water and not in excess of about 60% alcohol;
and packaging said dough in an alcohol-vapor impervious container.

9. A convenience food article consisting in;
a cookie dough admixture comprising water-washed flour, shortening, water and a sufficient quantity of ethyl alcohol to improve shelf-stability and quality of said food article, said ethyl alcohol not in excess of about 60% of the total liquid in said dough;
and a container impervious to alcohol-vapor and having said dough admixture sealed therewithin.

10. A convenience food article consisting in;
a puff pastry dough admixture comprising water-washed flour, shortening, water and a sufficient quantity of ethyl alcohol to improve shelf-stability and quality of said food article, said ethyl alcohol not in excess of about 60% of the total liquid in said dough;
and a container impervious to alcohol-vapor and having said dough admixture sealed therewithin.

11. A convenience food article consisting in;
a pizza dough admixture comprising water-washed flour, shortening, water and a sufficient quantity of ethyl alcohol to improve shelf-stability and quality of said food article, said ethyl alcohol not in excess of about 60% of the total liquid in said dough;
and a container impervious to alcohol-vapor and having said dough admixture sealed therewithin.

12. A convenience food article consisting in;
a gravy admixture comprising water-washed starch, water-washed gluten, flavoring and coloring constituents, water and a sufficient quantity of ethyl alcohol to improve shelf-stability and quality of said food article, said ethyl alcohol not in excess of about 60% of the total liquid in said admixture;

and a container impervious to alcohol-vapor and having said admixture sealed therewithin.

13. A convenience food product comprising;
a batter sealed inside a container impervious to alcohol vapor, said batter comprising shortening, water-washed reconstituted flour, water, and a sufficient quantity of ethyl alcohol to improve shelf-stability and quality of said food article, said alcohol constituting about 0.8 to 5% of the total weight of said batter.

References Cited by the Examiner

UNITED STATES PATENTS

| | | | |
|---|---|---|---|
| 1,988,058 | 1/1935 | Traller | 99—172 |
| 2,673,807 | 3/1954 | Berg | 99—172 |
| 2,849,323 | 8/1958 | Young | 99—172 X |
| 2,863,771 | 12/1958 | Ferrara | 99—14 |
| 2,895,831 | 7/1959 | Zacharia | 99—905 |

A. LOUIS MONACELL, *Primary Examiner.*

RAYMOND N. JONES, *Examiner.*